INVENTOR.
Masanori Yasui

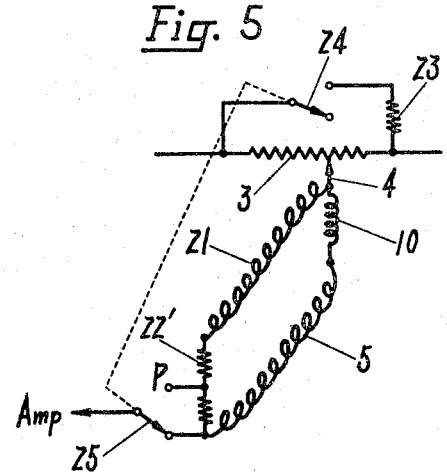
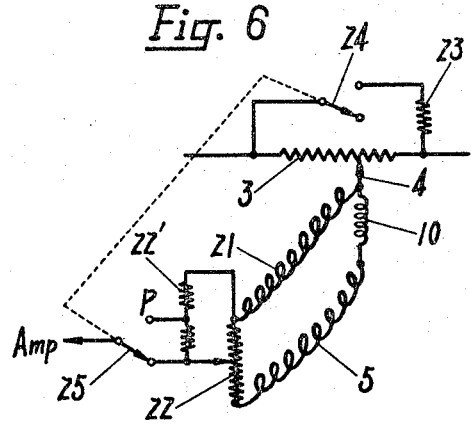

United States Patent Office 3,323,054
Patented May 30, 1967

3,323,054
SELF-BALANCING MEASURING SYSTEM HAVING ANTI-HUNT MAGNETIC MEANS FOR SLIDER DAMPING
Masanori Yasui, Tokyo, Japan, assignor to Toa Electronics Limited, Tokyo, Japan
Filed Feb. 4, 1963, Ser. No. 256,004
Claims priority, application Japan, Feb. 6, 1962, 37/3,772
2 Claims. (Cl. 324—99)

This invention relates to a self-balancing measuring graphic recording system, more particularly relates to improvements of a hunting preventing means therefor.

As well known, in a self-balancing measuring system if its response speed is increased there will be a tendency to produce hunting. It is therefore necessary to add proper damping to a balancing motor in the system in order to prevent such hunting.

The known damping means for preventing hunting generally make use of means wherein a direct current rate generator is connected to a balancing motor and is effective to generate a voltage proportional to the rotating speed of the balancing motor. This voltage is negatively fed back to the input of a balancing amplifier.

However, the known damping means increase the mass of the movable parts of the self-balancing measuring system due to the increase of the rotors of the rate generator and their use is not advisable from the view point of preventing hunting. Moreover, the noise voltage and residual voltage present in the generated voltage of the rate generator causes erroneous action.

An object of the present invention is to provide a self-balancing graphic recording system provided with a hunt preventing means free of the defects of the known damping means using a rate generator and yet provides the same damping effect by a simple mechanism.

In order to attain this object, in the self-balancing measuring or graphic recording system according to the present invention, a device for generating a voltage proportional to the balancing speed is provided in its pointer carriage and its generated voltage is negatively fed back to the input of a balancing amplifier so that the self-balancing action may be stabilized.

Other objects and features of the present invention will be made clear by the following explanation with reference to the accompanying drawings.

FIGURES 4 to 6 are circuit diagrams for damping means in which the damping force is adjustable.

Figure 1:
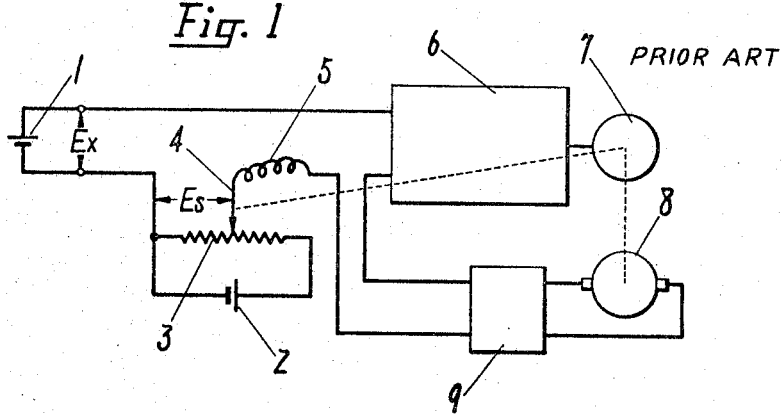
FIGURE 1 is a circuit diagram for a graphic recording system provided with a well known hunt-preventing means using a rate generator.

First of all, the well known conventional damping means shall explained with reference to FIGURE 1. A direct current rate generator 8 is connected to a balancing motor 7 and generates a direct current voltage proportional to the rotating speed of the motor 7. This voltage is negatively fed back to the input of a balancing amplifier 6 so that compensation or damping may take place.

In the drawing a power source 1 has a voltage output $Ex$ to be measured, 2 is a standard voltage source, 3 is a variable resistance or potentiometer, 4 is a sliding piece, 5 is a flexible coiled electrical wire for the slider and 9 is a voltage dividing circuit for the output of the rate generator 8. The voltage $Ex$ is compared with a voltage $Es$ taken out of the sliding contact or piece 4. The differential voltage between them is added to the balancing amplifier 6 so as to rotate the balancing motor 7 and to move the sliding piece 4 so that $Ex-Es$ may approach zero. Then, if the output of the rate generator 8 is applied to the input of the amplifier 6, the sliding piece will be stably stopped in a position wherein $Ex-Ex=0$.

The system according to the present invention is not provided with the above mentioned rate generator but is provided in its place with a generating coil operatively connected with the sliding piece.

Figure 2:
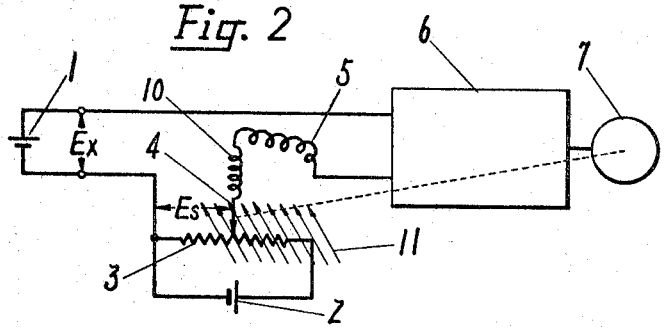
FIGURE 2 is a fundamental circuit diagram for a graphic recording according to the present invention.

FIGURE 2 shows the principal of the measuring system of the present invention. The same reference numerals as in FIGURE 1 are used to designate the same or corresponding parts. 10 is a generating coil provided in the pointer carriage of the sliding piece 4 and connected in series with a slider. The arrows 11 represent a uniform fixed direction magnetic field. Now, if the generating coil 10 is driven together with the sliding piece by the balancing motor, the voltage $e$ generated in the coil will be $$e = KV$$

wherein $K$ is a constant determined by the magnetic induction and the dimension and turns of the coil and $V$ is the moving speed (balancing speed) of the coil.

That is to say, as the voltage generated in the coil is proportional to the balancing speed and is added to the input of the amplifier, the stabilizing action will be the same as in the case where a rate generator is used.

Figure 3:
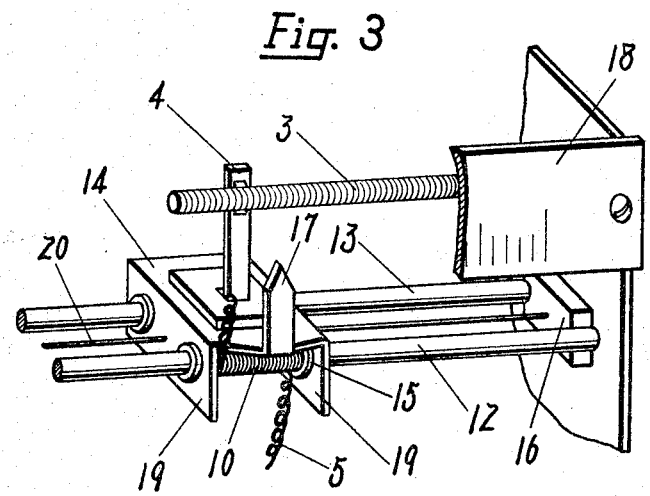
FIGURE 3 is a perspective fragmentary view illustrating an example of the mechanism of the hunt-preventing means for the system according to the present invention.

An example of the construction wherein the above mentioned generating device is fitted to a pointer carriage is illustrated in FIGURE 3. A pointer carriage 14 is mounted on two straight guide bars 12 and 13 so as to be movable thereon and is fitted with the sliding piece 4 and a pointer 17. The sliding piece is in contact with the variable resistor 3. The pointer is so arranged as to point to indicia on the front surface of a scale 18.

The position of the pointer thus indicates the value of the voltage $Ex$ to be measured.

In the present invention, a cylindrical winding drum 15 for the generating coil is coaxially fitted to one of the guide bars and is held between side plates 19 of the pointer carriage.

The guide bars 12 and 13 are made of a magnetic material. A permanent magnet 16 is set between the guide bars.

Therefore, the magnetic field of the permanent magnet will be substantially distributed between both guide bars. With movement of the pointer carriage, the coil 10 will also move in the flux field of the magnet and a voltage proportional to the speed of the pointer carriage will be generated in the coil. It is preferable to use a Teflon tube or coil form of a low friction coefficient for the above mentioned winding drum so that the pointer carriage 14 may move with a low friction. 20 is a string to drive the pointer carriage.

In the measuring system using a single scale, a proper damped state will be obtained by the predetermined number of turns of the coil and the magnetic induction and coupling. Therefore, if, as illustrated, the sliding piece 4 and the generating coil 10 are connected in series with each other and the flexible electrical wire 5 is connected thereto and is sufficiently "stretchable" it will not be necessary to specifically increase the number of such flexible coiled wires.

In an example as embodied in a measuring system of a full span of 50 mv., when the diameter and number of turns of the generating coil were made 0.05$\phi$, and 150 turns, respectively, and the magnetic induction was made about 150 gausses, satisfactory results were obtained. In view of this example, it is seen that, in the generating device of the present invention, the increase of the weight of the pointer carriage is very little.

Figure 4:
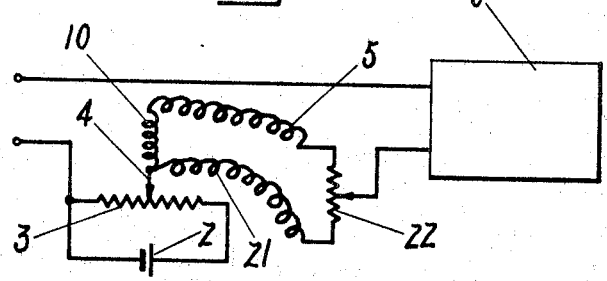

If it is desired to make the damping adjustable, as shown in FIGURE 4, two flexible coiled wires 5 and 21 may be connected at both ends of the generating coil 10, a variable resistance 22 may be inserted between them and its sliding contact may be connected to the input of the balancing amplifier 6.

Further, as shown in FIGURE 5, in a balancing measuring system of a multiple measuring range wherein a resistor 23 is connected through a rotary switch 24 in parallel with the variable resistance or potentiometer 3 so that the voltage between both ends of the variable resistance or potentiometer 3 may be varied by throwing in the rotary switch 24, it is possible that two flexible wires or leads 5 and 21 are connectable to both ends of the generating coil 10, a voltage dividing resistor 22 having a proper voltage dividing ratio is connected between them. A rotary switch 25 for connecting the voltage dividing resistor 22 into contact or circuit with a voltage dividing terminal P is provided. The two rotary switches 24 and 25 are mechanically operatively connected so that the voltage between both ends of the potentiometer or variable resistor 3 and the output voltage of the generating coil 10 may be simultaneously divided and varied.

Further, as shown in FIGURE 6, a system wherein the system shown in FIGURE 4 and the system shown in FIGURE 5 are combined with each other, that is to say, if a voltage dividing resistor 22' is connected between the sliding contact of the variable resistor 22 inserted between both ends of the generating coil 10 and the terminal on the sliding piece 4 side of the resistor 22 and the rotary switch 25 in contact with the voltage dividing terminal P and the rotary switch 24 of the resistor 23 inserted in parallel in the variable resistor 3 are operatively connected, it is possible to widely adjust the damping condition even in the balancing measuring system having a multiple measuring range.

What is claimed is:
1. A self-balancing graphic recording system comprising a circuit having a balancing amplifier, a balancing motor connected to said amplifier driven by the output of said amplifier, a potentiometer in said circuit having a sliding contact driven by said balancing motor so as to slide on said potentiometer so that an input to be measured may be balanced with the potentiometer voltage, a voltage-generating coil connected in series with said sliding contact and moved at the same speed as the moving speed of said sliding contact, a field producing means cooperative with said potentiometer developing a uniform magnetic field over the moving range of said voltage-generating coil so that a voltage generated by said generating coil is proportional to the speed at which balancing takes place, connections applying the last-mentioned voltage as feed back input to said balancing amplifier, said field-producing means comprising two substantially straight, guide rods disposed spaced and substantially parallel defining substantially alike and substantially parallel magnetic flux paths, magnet means disposed fixed between said two guide rods magnetically coupled thereto and developing therebetween magnetic flux defining said substantially uniform field, said voltage-generating coil being mounted for linear travel in opposite directions on one of said guide rods, means guided for travelling in two opposite directions on at least said one guide rod operably connecting said sliding contact and said voltage-generating coil causing said coil to travel through said field at said same speed as said sliding contact thereby to develop said voltage, a first rotary switch in said circuit, a shunt resistance means connected to the potentiometer through said first rotary switch, a voltage-dividing resistance means provided with a voltage-dividing terminal connected between both ends of said voltage generating coil, and a second rotary switch electrically connected to said voltage-dividing terminal, and means provided so that said first and second rotary switches are operatively connected with each other, whereby the divided voltage of said voltage-generating coil may be fed back to said amplifier input through said second rotary switch.

2. A self-balancing graphic recording system comprising a circuit having a balancing amplifier, a balancing motor connected to said amplifier driven by the output of said amplifier, a potentiometer in said circuit having a sliding contact driven by said balancing motor so as to slide on said potentiometer so that an input to be measured may be balanced with the potentiometer voltage, a voltage-generating coil connected in series with said sliding contact and moved at the same speed as the moving speed of said sliding contact, a field-producing means cooperative with said potentiometer developing a uniform magnetic field over the moving range of said voltage-generating coil so that a voltage generated by said generating coil is proportional to the speed at which balancing takes place, connections applying the last-mentioned voltage as feed back input to said balancing amplifier, said field-producing means comprising two substantially straight, guide rods disposed spaced and substantially parallel defining substantially alike and substantially parallel magnetic flux paths, magnet means disposed fixed between said two guide rods magnetically coupled thereto and developing therebetween magnetic flux defining said substantially uniform field, said voltage-generating coil being mounted for linear travel in opposite directions on one of said guide rods, means guided for travelling in two opposite directions on at least said one guide rod operably connecting said sliding contact and said voltage-generating coil causing said coil to travel through said field at said same speed as said sliding contact thereby to develop said voltage, a first rotary switch in said circuit, a shunt resistance means connected to said potentiometer through said first rotary switch, a variable resistance means provided with a sliding contact connected between both ends of said voltage-generating coil, a voltage-dividing resistance means provided with a voltage-dividing terminal connected between said sliding contact of said resistance means and said potentiometer sliding contact, a second rotary switch electrically connected with said voltage-dividing terminal, and means provided so that said first and second rotary switches are operatively connected with each other whereby the divided voltage of said generating coil may be fed back to said amplifier input through said second rotary switch.

References Cited

UNITED STATES PATENTS

| | | | |
|---|---|---|---|
| 2,581,133 | 1/1952 | Niemann | 324—100 X |
| 2,680,221 | 6/1954 | Gilbert | 324—125 X |
| 3,096,137 | 7/1963 | Silard | 324—100 X |

WALTER L. CARLSON, *Primary Examiner.*

RUDOLPH V. ROLINEC, *Examiner.*

G. L. LETT, J. J. MULROONEY, *Assistant Examiners.*